(12) United States Patent
Edie et al.

(10) Patent No.: US 6,579,479 B1
(45) Date of Patent: Jun. 17, 2003

(54) METHODS OF FORMING A PLURALITY OF SPHERES; AND PLURALITIES OF SPHERES

(75) Inventors: Colin Edie, Veradale, WA (US); David B. Keno, Fairfield, WA (US); Christopher L. Parfeniuk, Spokane, WA (US)

(73) Assignee: Honeywell International Inc., Morristown, NJ (US)

( * ) Notice: Subject to any disclaimer, the term of this patent is extended or adjusted under 35 U.S.C. 154(b) by 265 days.

(21) Appl. No.: 09/710,030

(22) Filed: Nov. 9, 2000

(51) Int. Cl.[7] .................................................. B29B 9/00
(52) U.S. Cl. ............................ 264/13; 65/21.2; 75/340
(58) Field of Search ................................ 264/5, 13, 14; 75/330, 340, 341; 65/21.2; 428/402

(56) References Cited

U.S. PATENT DOCUMENTS

| | | | |
|---|---|---|---|
| 2,774,660 A | * 12/1956 | Cook | ........................ 159/4.07 |
| 2,811,748 A | * 11/1957 | Smith | .......................... 264/13 |
| 3,294,511 A | 12/1966 | Hess | .......................... 65/142 |
| 3,843,340 A | * 10/1974 | Cone | .......................... 65/142 |
| 4,035,116 A | 7/1977 | O'Brien et al. | |
| 4,133,854 A | 1/1979 | Hendricks | .................... 264/10 |
| 4,828,886 A | 5/1989 | Hieber | |
| 4,935,173 A | * 6/1990 | Huey et al. | .................... 264/14 |
| 5,183,493 A | 2/1993 | Brandau et al. | .............. 75/335 |
| 5,560,543 A | 10/1996 | Smith et al. | |
| 5,810,988 A | 9/1998 | Smith, Jr. et al. | |
| 5,935,406 A | * 8/1999 | Hajmrle et al. | ............. 205/149 |
| 6,031,051 A | * 2/2000 | Wu | ............................ 428/402 |
| 6,083,454 A | 7/2000 | Tang et al. | .................. 266/202 |
| 6,268,275 B1 | * 7/2001 | Cobbley et al. | ............. 438/612 |
| 6,365,269 B1 | * 4/2002 | Atzesdorfer et al. | ... 106/287.34 |
| 6,365,976 B1 | * 4/2002 | Carter et al. | ................. 257/678 |

FOREIGN PATENT DOCUMENTS

| | | |
|---|---|---|
| EP | 0 325 798 A1 | 8/1989 |
| FR | 1 065 273 | 5/1954 |
| FR | 1 128 599 | 1/1957 |
| JP | 9-10986 | 1/1997 |
| TW | 372896 | 11/1999 |
| WO | 01/ 45246 | 6/1902 |

* cited by examiner

Primary Examiner—Mary Lynn Theisen
(74) Attorney, Agent, or Firm—Wells St. John P.S.

(57) ABSTRACT

The invention includes a method of forming a plurality of spheres. A passageway is provided, and the passageway terminates in an orifice. A liquid is flowed through the passageway and expelled through the orifice to form drops. The drops are then passed through a fluid to cool and solidify the drops into a plurality of spheres. At least some of the spheres are collected. A pressure of the liquid is maintained within about ±10% of a value during the formation of the drops that are cooled into the collected spheres. The invention also includes a plurality of at least several hundred spheres having a diameter of less than about 0.05 inches and characterized by at least 95% of the spheres being within ±1.3% of a mean diameter of the spheres.

38 Claims, 5 Drawing Sheets

METHODS OF FORMING A PLURALITY OF SPHERES; AND PLURALITIES OF SPHERES

TECHNICAL FIELD

The invention pertains to methods of forming a plurality of spheres, and also pertains to pluralities of spheres.

BACKGROUND OF THE INVENTION

Numerous applications exist in which it is desired to form pluralities of spheres which are uniform in diameter, spherical shape, and surface properties, with exemplary applications including formation of glass and/or ceramic beads for column-packing materials; formation of lead, bismuth, tungsten or steel beads for birdshot; and formation of solder beads (or balls) for utilization in semiconductor processing applications.

The formation of solder beads for semiconductor processing applications can be particularly difficult, as the uniformity requirements of such beads can be exceptionally high. For instance, an exemplary semiconductor processing application utilizing solder beads is so-called ball grid array processing wherein solder beads are transferred to a semiconductor device (or package) and subsequently melted to form electrical interconnections relative to the device. The beads are formed into a desired array by rolling the beads across a template having a plurality of indentations therein, and subsequently shaking the template to remove excess beads while leaving beads remaining in the indentations. If the beads are not all entirely uniform, some of the beads will roll differently than others, which can lead to some indentations not being filled and/or to some excess beads not rolling entirely from the template. Ultimately, the beads remaining on the template after the shaking are lifted (typically by a vacuum device) and transferred to a semiconductor substrate whereupon the beads are supposed to form a pattern defined by the pattern of indentations in the template. However, if excess beads remain on the template after the shaking, or if some of the indentations were not filled in the template, the pattern of beads transferred to the semiconductor substrate will be wrong, which can lead to failure of devices associated with the semiconductor substrate. The described ball grid array process is an important process relative to formation of electrical interconnects during chip-scale packaging of semiconductor devices, and can be associated with, for example, flip-chip applications. Additionally, the ball grid array process can be utilized during formation of packages larger than chip-scale.

Several methods have been developed for forming pluralities of small spheres, including methods in which the spheres are punched, cut, and/or rolled from starting materials. However, there remains a need for improved methodology of forming pluralities of uniform spheres.

SUMMARY OF THE INVENTION

In one aspect, the invention encompasses a method of forming a plurality of spheres. A passageway is provided, and the passageway terminates in an orifice. A liquid is flowed through the passageway and expelled through the orifice to form drops. The drops are then passed through a fluid to cool and solidify the drops into a plurality of spheres. At least some of the spheres are collected. A pressure of the liquid is maintained within about ±10% of a value during the formation of the drops that are cooled into the collected spheres. In particular embodiments, the pressure of the liquid is maintained steady to within about ±3% during the formation of the drops that are cooled into the collected spheres, and can, for example, be maintained steady to within about ±0.05% during the formation of the drops that are cooled into the collected spheres.

In another aspect, the invention encompasses a plurality of at least several hundred spheres having a diameter of less than about 0.05 inches and characterized by at least 95% of the spheres being within about ±1.2% of a mean diameter of the spheres.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
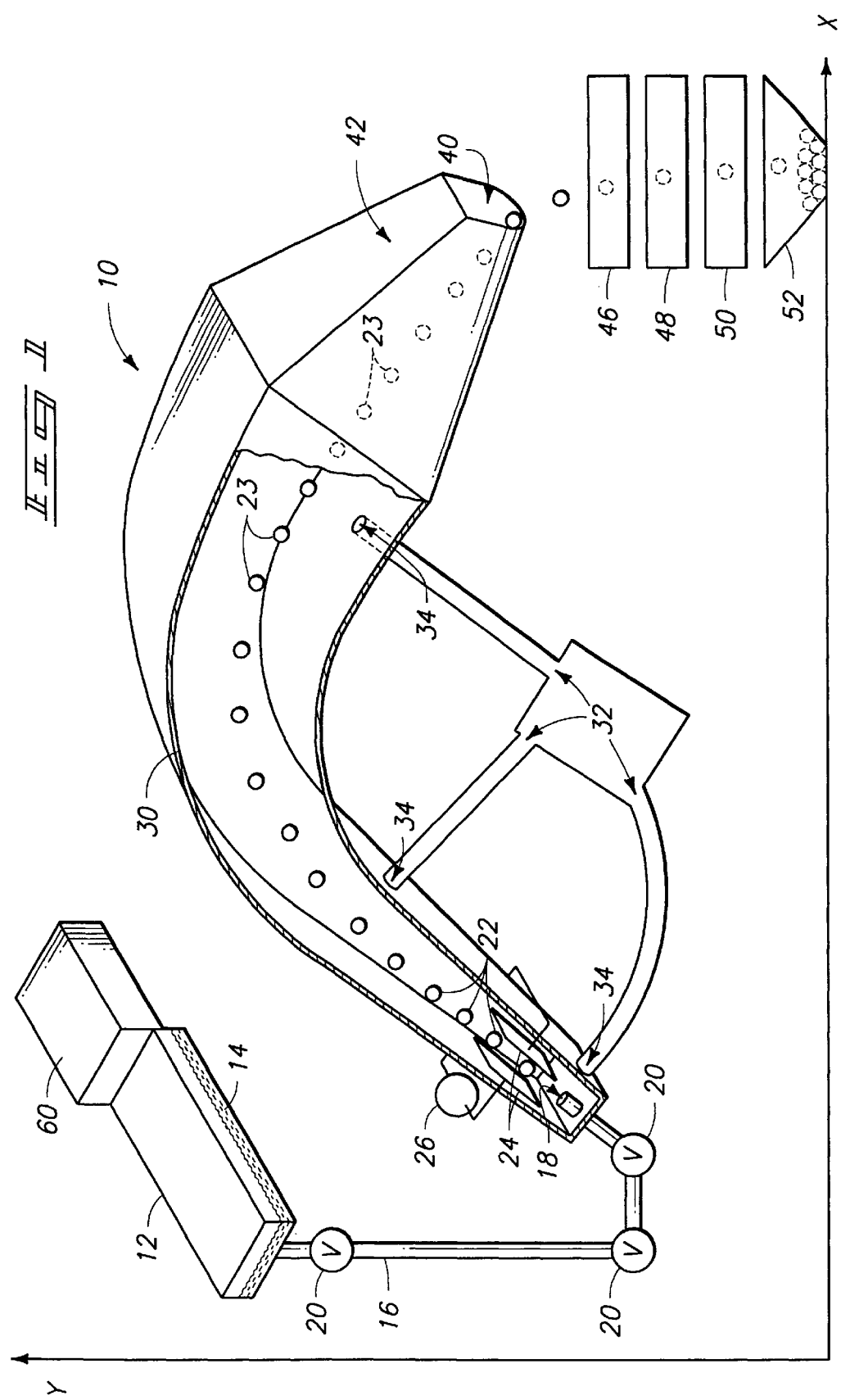
FIG. 1 is a diagrammatic, schematic partially cross-sectional view of an apparatus which can be utilized in accordance with the methodology of the present invention to form a plurality of uniform spheres.

The invention encompasses methods of forming a plurality of uniform spheres. In one aspect, the invention encompasses a recognition that uniform spheres can be formed by solidifying drops of liquid material, provided that the drops themselves are uniform and remain uniform during the solidification process. Accordingly, the invention encompasses methodology for forming a stream of uniform drops, with the drops being subsequently cooled to form a plurality of uniform spheres.

An embodiment of the invention is described with reference to FIG. 1, which shows an apparatus 10 that can be utilized for forming a plurality of uniform spheres. Apparatus 10 is described with reference to a vertical axis "Y" and a horizontal axis "X".

Apparatus 10 includes an elevated vessel 12 comprising a liquid 14. The sides of vessel 12 are shown in cross-sectional view so that liquid 14 can be seen within vessel 12. Vessel 12 can comprise any of numerous fluid-tight materials, such as, for example, metal or plastic. Liquid 14 comprises a molten material and can comprise, for example, molten metal, molten plastic, or molten glass. In a particular embodiment, apparatus 10 is utilized for forming a solder, and liquid 14 comprises a molten mixture which includes one or more of tin, lead, copper and silver. The mixture can consist essentially of one or more of tin, lead, copper and silver, or consist of one or more of tin, lead, copper and silver. An exemplary solder comprises a mixture consisting essentially of tin and lead, with the concentration of tin being about 63% (by weight). Another exemplary solder composition comprises tin, copper and silver.

Vessel 12 is configured to maintain material 14 at a temperature above a melting temperature of the material. For instance, if material 14 comprises a solder composition of tin and lead, it can have a melting temperature of about 180° C. Accordingly vessel 12 is preferably maintained at a temperature above 180° C. to keep the solder in a molten form, with a preferable operating temperature being from about 250° C. to about 270° C. By maintaining the temperature well in excess of the melting point of material 14, a viscosity of the material can be kept low to improve flow properties of the material.

Vessel 12 is elevated above the ground along vertical axis "Y" to provide a pressure head of molten material 14. An exemplary distance of elevation of vessel 12 is from about 10 feet to about 50 feet, with about 30 feet being typical. Vessel 12 is held by a support structure (not shown). Although vessel 12 is shown in a rectangular-shape, it is to be understood that vessel 12 can comprise numerous geometrical configurations. However, it is desired that vessel 12 retain the mass of molten material 14 as a relatively thin layer having a large surface area. For instance, vessel 12 can retain molten material 14 as a liquid that is about 1 inch thick, and has a surface area of about 8 square feet. The large surface area allows substantial quantities of material to be flowed into or out of vessel 12 without substantially changing a height of material 14 within vessel 12. The height of material 14 within vessel 12 ultimately determines a pressure of material flowing through apparatus 10, and accordingly the large surface area provided by vessel 12 can reduce pressure fluctuations within apparatus 10 as compared to the fluctuations that would occur with the same amount of mass 14 and a smaller surface area. The fluctuation in height of material 14 within vessel 12 can be maintained to be less than ±10%, or in particular embodiments to less than ±3%. It can be preferred that the fluctuation in height of material 14 within vessel 12 is less than ±0.05% during operation of apparatus 10, which translates to a pressure of liquid 14 within apparatus 10 being steady to within about ±0.05% during operation of apparatus 10.

Molten material 14 can be provided within vessel 12 by any of numerous methods. One method is to provide a preheating vessel 60 adjacent and above vessel 12, and then to melt solid material within preheating chamber 60 and allow the molten material to trickle into vessel 12 during operation of apparatus 10. For instance, if apparatus 10 is utilized for forming solder, solid bars of solder can be provided within preheater 60 and melted to provide the molten material 14.

A fluid passageway 16 extends downwardly from vessel 12 and terminates in an orifice, or nozzle, 18. Fluid passageway 16 can comprise, for example, a pipe, with the term "pipe" utilized herein to encompass tubing and more traditional "pipes". If passageway 16 comprises a pipe, it can have a diameter of from about ¼ inch to ½ inch. The pipe preferably comprises a thermally conductive material, such as, for example, metal. Further, the pipe is preferably wrapped in insulation and coupled with a heater so that the pipe can be maintained at a constant temperature during operation of apparatus 10. A suitable temperature of pipe 16 is a temperature above a melting temperature of material 14. If material 14 comprises a solder melting at about 180° C., a suitable temperature of pipe 16 can be, for example, about 250° C. A plurality of valves 20 are provided along passageway 16 and can be used to provide control of fluid flow through passageway 16.

Figure 2:
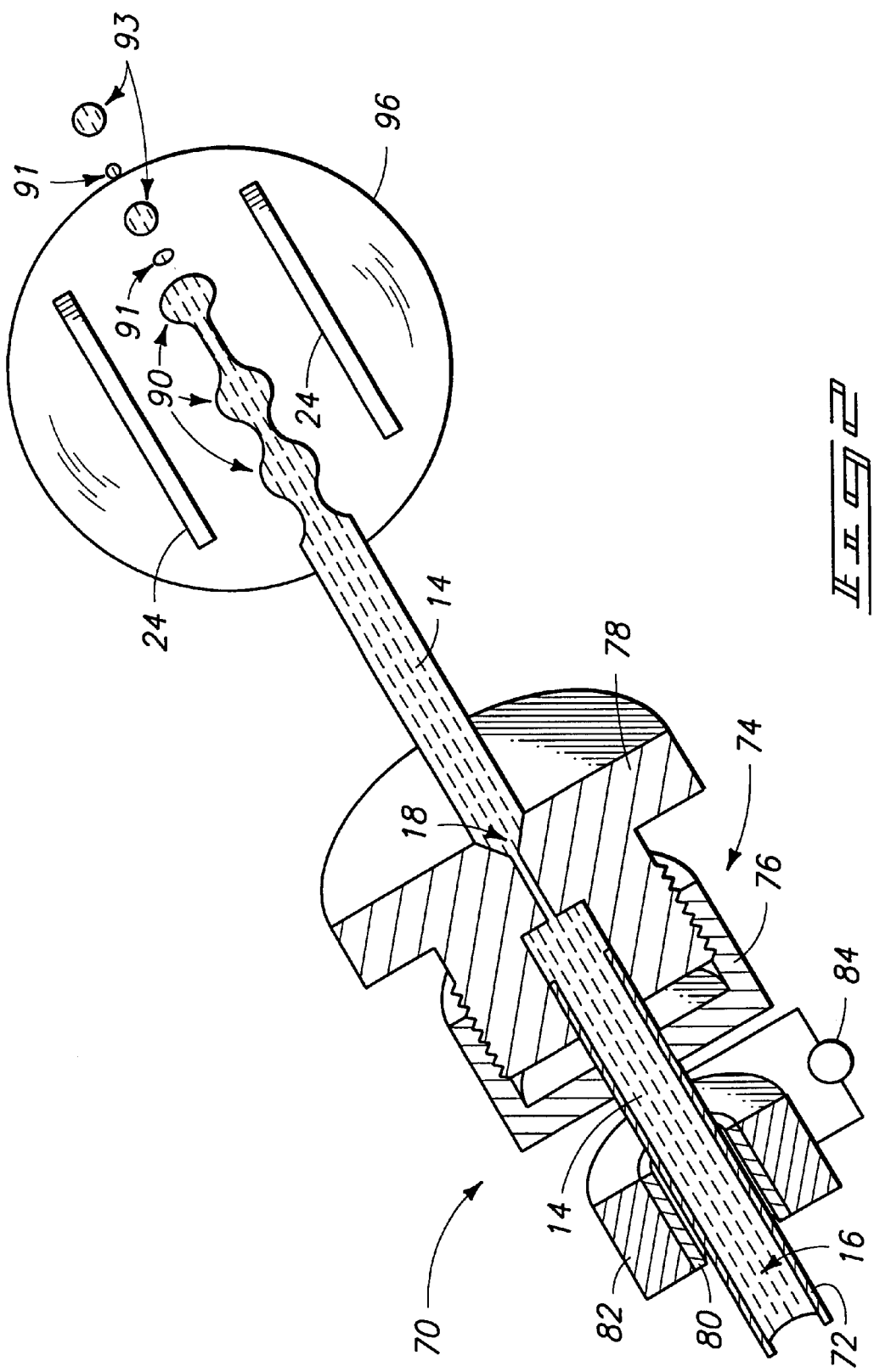
FIG. 2 is a cross-sectional view of a nozzle which can be utilized in the apparatus of FIG. 1, and shown in operation forming spherical drops of liquid.

The liquid material 14 is expelled from nozzle 18 as a perturbed stream which breaks to form drops 22 (the perturbed stream is shown in FIG. 2). It is noted that the drawing of FIG. 1 is not to scale, and that the drops 22 are shown disproportionately large relative to apparatus 10 to simplify illustration of operation of apparatus 10. In practice, drops 22 can have diameters that are less than 0.05 inches. The drops 22 are passed between a pair of electrically charged plates 24 to impart a charge to drops 22. The charge can be either a net positive charge or a net negative charge. Regardless, it is preferable that all of drops 22 carry the same charge as one another so that the drops repel one another to alleviate collisions between the drops. Charged plates 24 are electrically connected with a power source 26 which provides the electrical charge to the plates. An exemplary charge between plates 24 can be from about 0 kilovolts to about 20 kilovolts, with a preferred charge being from 0.9 kilovolts to 1.2 kilovolts.

Drops 22 are expelled into a chamber 30. Chamber 30 can comprise, for example, metallic ductwork. Chamber 30 is shown with one side illustrated in a partially cut away view so that drops 22 can be seen travelling within the chamber.

A fluid is provided within chamber 30 to cool drops 22. Such fluid can comprise a liquid or gas, and can simply comprise, for example, air. Alternatively, the fluid can comprise a gas 32 pushed into chamber 30 through a plurality of inlets 34. Gas 32 is preferably non-reactive with the material of drops 22, and can comprise, for example, nitrogen, argon, carbon dioxide, and/or carbon monoxide. Preferably, diatomic oxygen ($O_2$) is not present within gas 32, as diatomic oxygen can disrupt formation of droplets 22. It is believed that diatomic oxygen affects a surface tension of materials ejected from orifice 18. Regardless of the reason for the effect of diatomic oxygen on formation of drops 22, it is preferred that a concentration of diatomic oxygen within chamber 30 be less than 200 ppm, and in some instances less than 100 ppm.

The gas 32 flowed into chamber 30 can be at ambient temperature, or can be cooled to enhance cooling of drops 22 within chamber 30. For instance, the gas can comprise nitrogen at a temperature of from −52° C. to 25° C. The flow rate of gas 32 into chamber 30 can be, for example, about 750 standard cubic feet per hour. The preferred rate of flow can vary depending on the gas-tightness of chamber 30. If chamber 30 is constructed to be extremely gas-tight, the flow rate of nitrogen into chamber 30 can be reduced. The gas 32 can have two primary purposes within chamber 30. One is to provide a positive pressure within chamber 30 so that oxygen from the air does not enter chamber 30 and disrupt drop formation, and the other is to provide coolant flow through chamber 30.

The flow rate of gas 32 through each of ports 34 can be different. For instance, it can be desired to have a relatively low coolant gas flow rate proximate orifice 18 to avoid excessive cooling during drop formation, and to have a higher coolant gas flow rate downstream of drop formation. The relative flow rate of gas 32 through the various ports 34 can be adjusted with valves (not shown).

Chamber 30 terminates in an open end 40 from which the solidified drops 22 exit as spheres 23. Since material 14 is initially provided within chamber 30 as liquid drops 22, and exits chamber 30 as spheres 23; a transition occurs within chamber 30 where the material 14 is transformed from a liquid form to a solid form. Preferably, the oxygen level within chamber 30 is less than 200 ppm at locations where the material is in liquid form, but the oxygen concentration can increase at locations of chamber 30 downstream of where material 14 has solidified into spheres 23.

The spheres 23 exit chamber 30 with a velocity. Such velocity is determined by an initial velocity of drops 22 within chamber 30, an angle of the trajectory of drops 22 relative to the horizontal axis "X", and a location of the end 40 of chamber 30 relative to the ground (i.e., a displacement of end 40 along vertical axis "Y"). Preferably, end 40 is about 6 feet above the ground. Such distance can allow suitable energy to be retained within spheres 23 such that the spheres can roll through one or more sorting operations without additional energy being input into the spheres.

Spheres 23 are initially caught upon a landing 42 at a terminal end of chamber 30, and are then rolled or bounced off of the landing into sorting and/or collection apparatuses 46, 48, 50 and 52. Landing 42 preferably comprises a relatively soft material, such as, for example, expanded foam polyurethane. Landing 42 can reduce a downward velocity of spheres 23, and can direct spheres 23 toward apparatuses 46, 48, 50 and 52. In the shown embodiment, landing 42 is in a shape of a tube, or sock, defining a terminal end of chamber 30.

As discussed previously, the velocity of spheres 23 at the point at which spheres 23 impact landing 42 can be a function of several parameters. Among such parameters is a pressure of fluid 14 at nozzle 18, which ultimately determines a velocity of fluid 14 from nozzle 18. Such pressure is preferably above 80 psi, and can be, for example, from about 80 psi to about 200 psi. Further, the pressure can be controlled to remain steady to within about ±10%, preferably to within ±3%, and more preferably to within about ±0.05%, during operation of apparatus 10. Additionally, the angle at which drops 22 are expelled relative to horizontal axis "X" can affect a velocity of spheres 23. Such angle is preferably between about 20° and about 50°, with an exemplary angle being about 30°. It is noted that drops 22 are expelled upwardly into chamber 30. The upward direction of drops 32 enables a velocity of spheres 23 at end 40 to be controlled and adjusted. In contrast, if drops 22 were expelled downwardly, the velocity would be determined by air resistance and gravity, which can be difficult to control.

Orifice 18 is preferably a height of from about 1 foot to about 6 feet off of the ground, and can be, for example, a height of from about 2 feet to about 5 feet from the ground.

It is noted that chamber 30 has a shape which starts narrow relative to orifice 18 and is wide near a top of the path of drops 22. The relative width dimensions of chamber 30 can be determined by the variation in path of drops 22 and spheres 23 within chamber 30. Specifically, at orifice 18 the drops are tightly aligned along a narrow flow path. However, by the time that the drops reach the top of their arc of travel, they are no longer aligned along a narrow path. Accordingly, chamber 30 is widened to accommodate the wider path that the drops and spheres can be along so that the drops and spheres do not impact sidewalls of chamber 30 during flight of the drops and spheres through chamber 30. In other words, chamber 30 is widened near the top of the arc of travel of ejected material 14 to accommodate uncertainties in the positions of drops 22 and/or spheres 23 at the top of the arc.

The spheres 23 exiting from landing 42 are passed through a plurality of sorting devices 46, 48 and 50, and are ultimately collected in a receptacle 52. Although devices 46, 48, 50 and 52 are shown vertically aligned relative to one another, it is to be understood that one or more of the devices can be horizontally displaced relative to the other devices. Spheres 23 can be transported between horizontally-displaced devices by, for example, a conveyor.

Sorting devices 46, 48 and 50 are optional, but it is found that uniformity of the product obtained from chamber 30 can be improved by sorting of the materials that exit the chamber. One or more of sorting devices 46, 48 and 50 can comprise a screen. In an exemplary embodiment of the present invention, sorting device 46 will comprise a sorting chute 100 which is described with references to FIGS. 4 and 5, and sorting devices 48 and 50 will comprise screens. Preferably, one of the screens 48 and 50 will be defined by a pore size which is larger than the diameter of the majority of the spheres 23 exiting from chamber 30, and the other of the screens will be defined by a pore size smaller than the diameter of the majority of the spheres 23 exiting from chamber 30. Accordingly, the screens can be utilized to separate the majority of the spheres 23 from particles larger than the majority of the spheres, as well as from particles smaller than the majority of the spheres. Although spheres 23 are shown passing through both of sorting devices 48 and 50, it is to be understood that the majority of spheres 23 would actually pass across a screen defined by a pore size smaller than the majority of the spheres, and accordingly would exit from an end of the screen, rather than passing through the screen.

Drops 22 are preferably formed within apparatus 10 to be substantially uniform in size relative to one another so that the collected spheres 23 will also be substantially uniform relative to one another. Substantial uniformity of drops 22 can be accomplished by holding a pressure, and preferably also a temperature, of liquid material 14 substantially constant during operation of apparatus 10. Accordingly, the temperature of material 14 preferably remains within ±5% of a value during formation of drops 22 that ultimately solidify into collected spheres, and a pressure of molten material 14 preferably remains within 0.05% of a value during formation of the drops that are ultimately solidified into collected spheres. It is noted that the pressure of material 14 will vary along passageway 16, so that numerous values of pressure exist during operation of apparatus 10. However, it is desired that the particular value of pressure proximate orifice 18 will remain within ±0.05% during operation of apparatus 10 and collection of uniform spheres 23.

Another factor that can influence the uniformity of drop formation, besides the temperature and pressure of material 14 proximate orifice 18, is the stability of temperature control within chamber 30. A flow rate of gas 32 will preferably remain constant during formation of collected spheres to enable a stable temperature to remain within chamber 30 during such formation of collected spheres.

All of the structures shown in FIG. 1 can be supported by various scaffolds and other support members which are not shown in the illustration of FIG. 1, but which could be readily constructed by persons of ordinary skill in the art.

A diameter of the spheres 23 can be determined by a width of an opening of nozzle 18. In an exemplary application, apparatus 10 is utilized for forming solder balls having a diameter if about 0.03 inches, and nozzle 18 has a circular opening with a diameter of about 0.01775 inches.

An exemplary nozzle which can be utilized in methodology of the present invention is described with reference to FIG. 2 as a nozzle apparatus 70. The apparatus comprises a pipe 72 extending into a plug 74. Pipe 72 is an extension of passageway 16, and can comprise, for example, ½ metal pipe, such as, for example, ½ stainless steel tubing. Plug 74 comprises a first portion 76 proximate an end of pipe 72, and a second portion 78 engaged within first portion 76. Plug 74 can comprise, for example, a swage-lock type plug, with second portion 78 threadedly engaged within first portion 76. Second portion 78 comprises orifice 18 extending therein. Orifice 18 can be lined with a hard material (not shown).

Nozzle assembly 70 also comprises a piezo-electric material 80 encircling pipe 72 and an electrically conductive material 82 around piezo-electric material 80. Conductive material 82 and pipe 72 are electrically connected with a power source 84. In operation, power source 84 stimulates piezo-electric material 80 to cause vibration of material 14 within pipe 16, and ultimately to cause drop formation within material 14 as the material is expelled through orifice 18.

It is noted that the shown nozzle assembly is an exemplary assembly, and that other nozzle assemblies can be utilized in methodology of the present invention. It is also noted that the shown assembly is probably only useful if the temperature of pipe 16 and material 14 remain below 350° C. Specifically, since piezo-electric material 80 contacts pipe 16, the material will be exposed to the temperature of pipe 72. Most piezo-electric materials stop functioning at temperatures of 350° C. or above. However, if it is desired to have material 14 and/or pipe 72 at temperatures in excess of 350° C., nozzle apparatus 70 can be re-designed so that piezo-electric material 80 is spaced from pipe 72 by a thermally insulative spacer. Exemplary designs of nozzle apparatuses in which a piezo-electric material is spaced from a pipe by insulative materials are provided in U.S. Pat. Nos. 5,810,988 and 5,560,543.

In operation, material 14 is expelled through pipe 72 and out of orifice 18. Simultaneously, piezo-electric material 80 is electrically stimulated to cause a waveform to be superposed on material 14 and thus to influence drop formation in the ejected material 14. FIG. 2 illustrates an exemplary mechanism of drop formation, and specifically shows that the material 14 begins to form bulbous regions 90 after exiting orifice 18. Such bulbous regions 90 eventually separate into distinct drops 91 and 93, with drops 91 being substantially smaller than drops 93, and with each drop 93 being paired with a drop 91. Ultimately, the pairs of drops 93 and 91 merge to form the drops 22 of FIG. 1.

FIG. 2 shows charged plates 24 adjacent the stream of material 14 at about the location where drops break from the stream. Plates 24 can thus charge the drops at an early stage in the drop formation process. In the shown embodiment, plates 24 are provided at a location relative to stream 14 where bulbous regions 90 are still connected to the primary stream, and accordingly, prior to formation of discreet drops. It is to be understood that plates 24 can also be provided downstream of the shown location, and specifically can be provided at a location where discreet drops have formed. Plates 24 are shown to be relatively smaller in FIG. 2 than in FIG. 1 for convenience of illustration, neither FIG. 2 or FIG. 1 is drawn to scale.

FIG. 2 shows a lens 96 which can be coupled with a high speed video camera equipped with an electronic strobe and utilized to monitor the drop-formation process. Such monitoring can enable a person to adjust various parameters associated with apparatus 10 (FIG. 1), such as, for example, frequency, orifice size and/or temperature; to optimize uniform drop formation.

It typically takes some period of time for nozzle apparatus 70 and the upstream portions of apparatus 10 (FIG. 1) to equilibrate. Accordingly, apparatus 10 is preferably run for a period of time of, for example, at least about 15 minutes prior to collecting uniform spheres. Any spheres generated during the equilibration process can be melted and resupplied to apparatus 10 as molten material 14.

Figure 3:
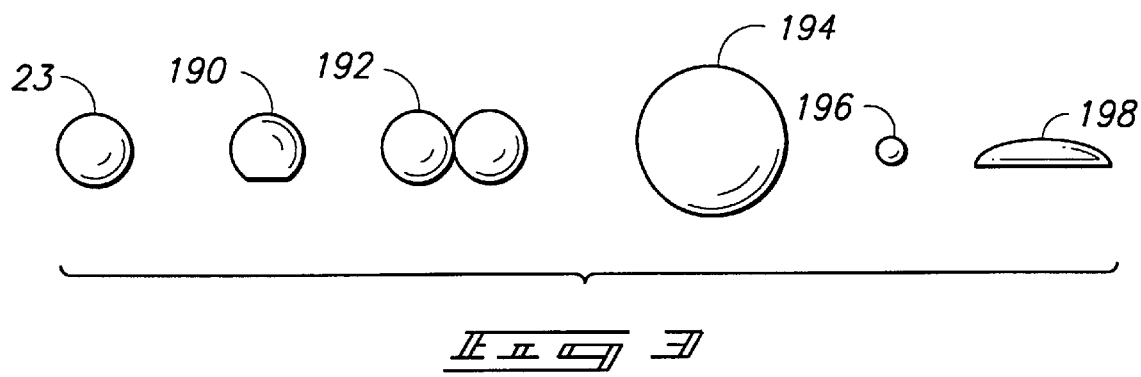
FIG. 3 is a view of several different types of particles that can be formed during a sphere-forming operation of the present invention.

Even if apparatus 10 of FIG. 1 is fully equilibrated prior to formation of spheres 23, there can still be some defective particles present within the stream of spheres exiting chamber 30 of the apparatus. FIG. 3 illustrates several of the types of particles that can exit apparatus 10. Specifically, FIG. 3 illustrates a perfectly spherical particle 23 of desired size. Also shown is a particle 190 having a dimple, a particle 192 comprising a twinned structure, a particle 194 larger than the desired size, a particle 196 smaller than the desired size, and a particle 198 having a flattened shape. The particles 190, 192, 194, 196 and 198 can be formed during the processing of FIG. 1 through various mechanisms. For instance, particle 190 can be formed if a particle 23 lands on too hard of a landing 42, or with too much velocity; twinned structure 192 can occur if two nearly hardened drops 22 contact one another before fully solidifying; large particle 194 can occur if two or more liquid drops 22 combine with one another while still in a fully liquid state; small particle 196 can occur if a small liquid drop 91 of the FIG. 2 process is not joined with a larger liquid drop before solidifying; and particle 198 can occur if a liquid drop 22 impacts a side of chamber 30 prior to solidifying.

The processing described with FIG. 1 forms very few defective particles, as evidenced by the FIG. 6A graph that is described below. However, it can be desired to further purify the particles to remove the few defective particles that have been formed. Accordingly, the various sorters 46, 48 and 50 are shown configured to sort particles exiting from the chamber 30 of the FIG. 1 process. The sorters can comprise conventional screen sorters, or alternatively at least one of the sorters can be a novel sorter of the type described in FIGS. 4 and 5 as a sorting chute 100.

Chute 100 is a tube which is angled relative to horizontal axis "X" by an angle α. Angle α can be from greater than 0° to less than 90°, and preferably is from about 5° to about 30°. Tube 100 is rotated during sorting of particles as shown by arrow 102. Preferably, such rotation is at a rate which is less than or equal to about 110 rotations per minute (rpm), and which can be, for example, from about 10 rpm to less than 110 rpm; with a typical range being from about 50 rpm to about 80 rpm. Tube 100 can have an internal diameter of, for example, from about 10 inches to about 12 inches.

In the shown operation, particles 23 fall from landing 42 (shown in a fragmentary view in FIG. 4 relative to the view of FIG. 1) into an upper end 104 of sorting chute 100, and then proceed through chute 100 to exit from lower end 106. The rotation of sorting chute 100 causes the particles 23 to effectively travel a curved path along a sidewall of the tube as they proceed from end 104 to end 106. Specifically, the sidewall is constantly rotated and the spheres 23 remain along a bottom of the tube. Accordingly, the spheres have traveled a curved path relative to the rotating sidewall in order to remain along a bottom of the tube. It is found that perfectly spherical particles 23 will travel along the curved path at a first rate which enables the particles to remain along a bottom of the tube, and that non-spherical particles (such as, for example, 190, 192, and 198 of FIG. 3) will travel the path at a different rate which will cause the non-spherical particles to be along a side of the tube, rather than at the bottom. Such is illustrated in FIG. 5 wherein the majority of the particles exiting the tube are shown at a bottom of the tube and would constitute spherical particles, and a few non-spherical particles are shown at a side of the tube. A vacuum device 110 is provided to suck the non-spherical particles from the side of the tube. It is noted that even though non-spherical particles are shown only at one side of the tube, the particles can also be at the other side of the tube. Further, it is noted that the tube rotation is preferably chosen to be at a rate which separates spherical particles non-spherical particles. If the tube rotation is too fast, all the particles can spin along sidewalls of the tube and separation can be inefficient. Also, if tube rotation is too slow, all of the particles can stay along a bottom of the tube and separation can be inefficient.

Figure 4:
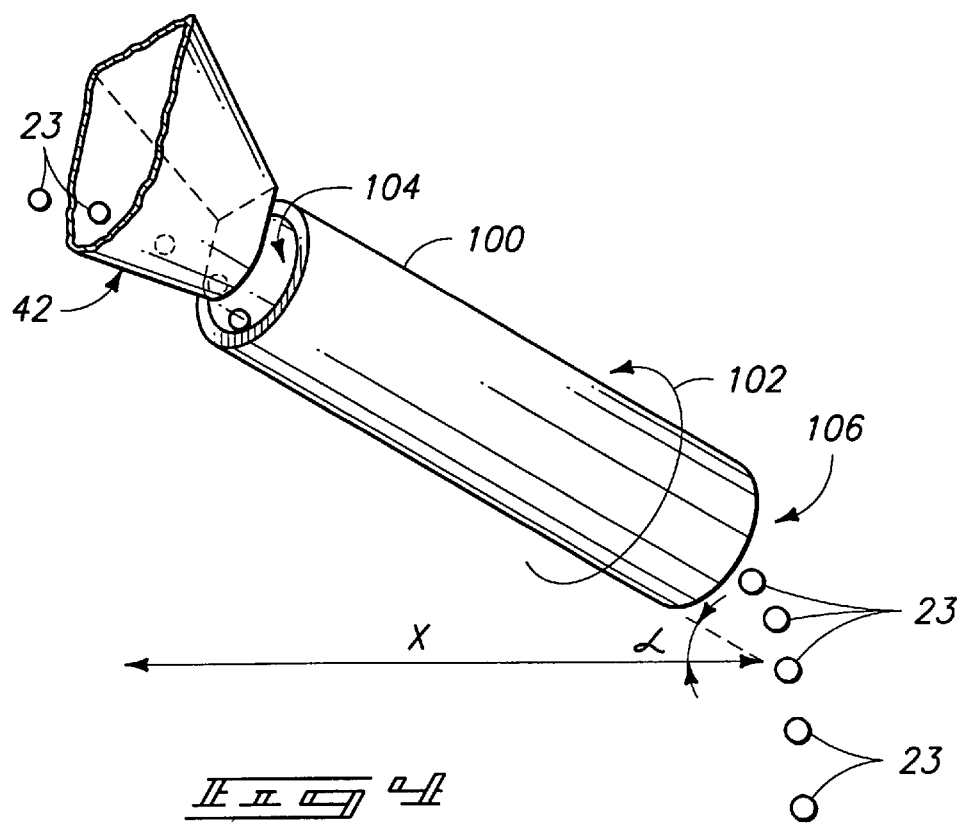
FIG. 4 is a view of a sphere sorting apparatus that can be utilized in methodology of the present invention for sorting desired spheres from other particles formed by a sphere-forming apparatus.
Figure 5:
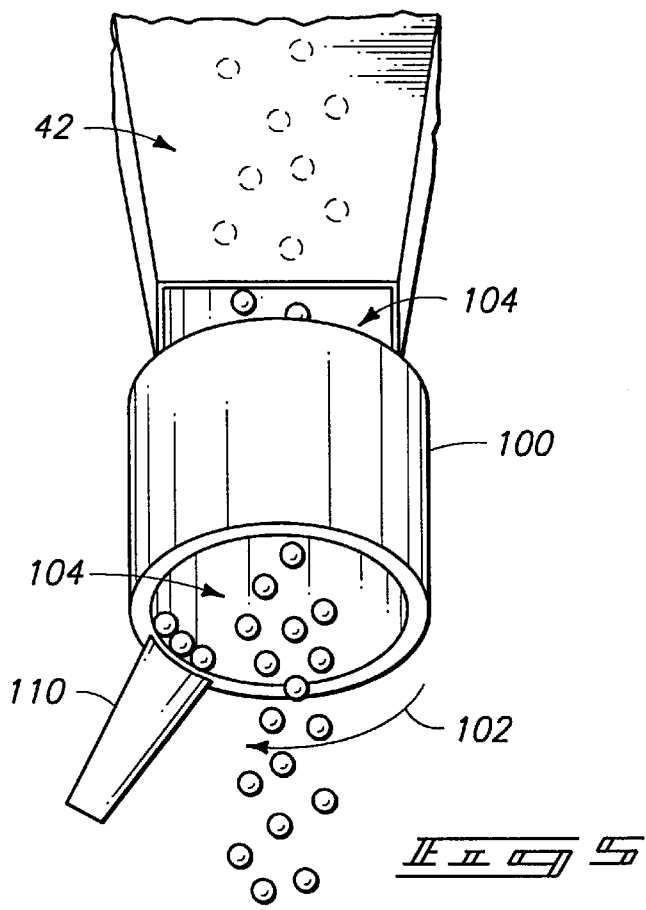
FIG. 5 is a view of a bottom end of the sorting apparatus of FIG. 4.

The sorting chute 100 of FIGS. 4 and 5 can be particularly advantageous for separating twinned structures 192 (FIG. 3) from spherical structures. A twinned structure 192 will act similarly to a spherical structure 23 if separated utilizing screens alone. Accordingly, it can be extremely difficult to separate the twinned structures 192 from spherical structures 23 utilizing conventional methods. However, the sorting chute of the present invention provides a method which can be utilized to effectively separate twinned structures 192 from spherical structures 23.

The processing of the present invention can be utilized to form a more uniform plurality of spheres than could be achieved by prior art methods. Specifically, processing of the present invention can be utilized to form a plurality of at least several hundred spheres, and even at least several million spheres or more, having a mean diameter of about 0.03 inches and characterized by at least 95% of the spheres (i.e., a 2σ level, where σ represents a standard deviation of the spheres) being within about ±0.0004 inches of the mean diameter (i.e., within about ±1.3% of the mean diameter); and in the shown embodiment at least 95% of the spheres are within 0.00035 inches of the mean diameter (i.e., within about ±1.2% of the mean diameter). Additionally, processing of the present invention can be utilized to form the plurality of spheres having a mean diameter of about 0.03 inches and characterized by at least 99.73% of the spheres (i.e., a 3σ level, where σ represents a standard deviation of the spheres) being within about ±0.0006 inches of the mean diameter (i.e., within about ±2% of the mean diameter); and in the shown embodiment 99.73% of the spheres are within ±0.00053 inches of the mean diameter (i.e., within about ±1.8% of the mean diameter).

Figure 6A:
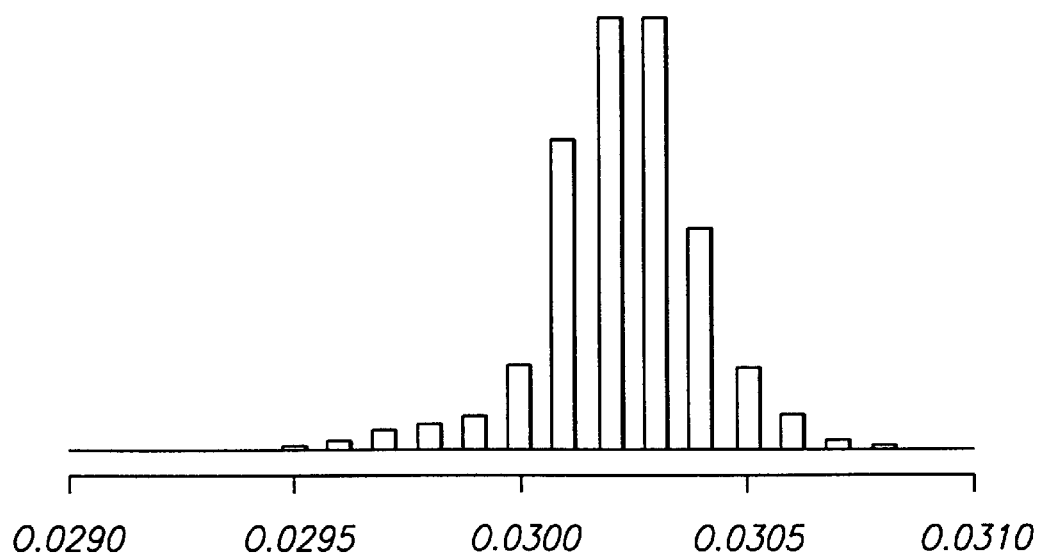
FIGS. 6A and 6B are graphical illustrations of the uniformity of spheres produced in accordance with methodology of the present invention (FIG. 6A) and the uniformity of commercially available spheres produced by prior art methodology (FIG. 6B).

FIG. 6A illustrates a statistical categorization of spheres produced in accordance with methodology of the present invention. The spheres categorized in FIG. 6A correspond to 10 separate combined lots of spheres formed in accordance with methodology of the present invention, with a lot being defined as a group of spheres acquired on a given day, and separate lots being defined as groups of spheres acquired on different days from one another. The graph of FIG. 6A thus evidences long-term stability of a process of the present invention, and further evidences that a tight size distribution that can be obtained with any given lot.

It is noted that the spheres categorized in FIG. 6A have exited directly from chamber 30, and have not been subsequently processed by any sorting means. Accordingly, the incorporation of sorting methodology of the present invention, in combination with the sphere-forming methodologies, can enable even better distributions of spheres to be obtained than are graphically illustrated in FIG. 6A.

Figure 6B:
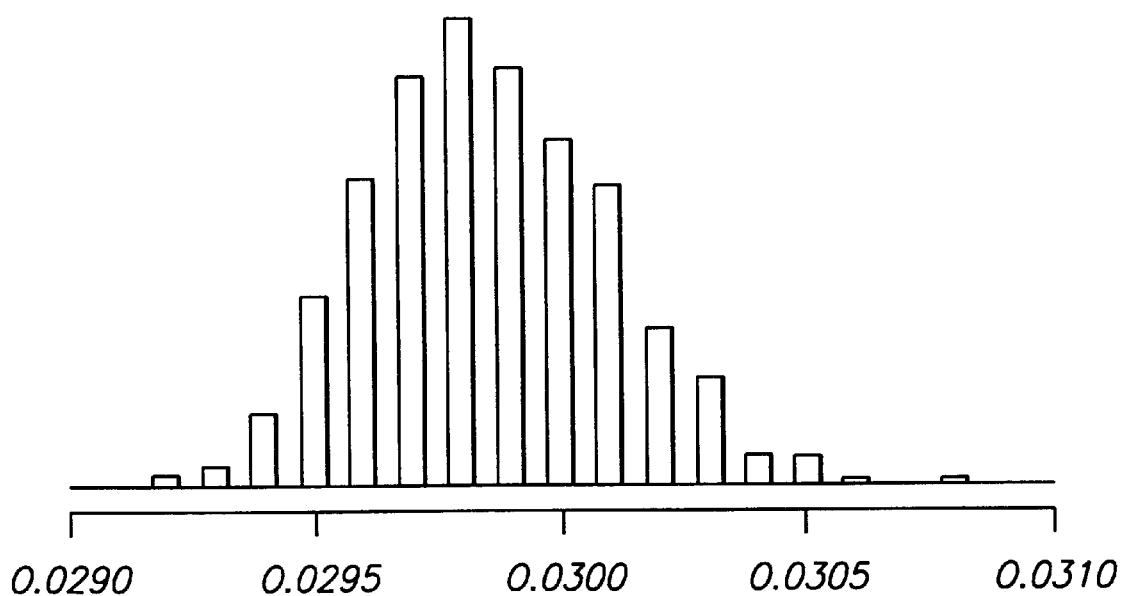

A set of prior art spheres is statistically categorized in FIG. 6B, and is found to contain a much wider distribution of sphere sizes than do the spheres produced in accordance with methodology of the present invention. The plurality of spheres of FIG. 6B is characterized by at least 95% of the spheres being within ±0.00049 inches of the mean diameter of about 0.03 (i.e., being within about ±1.62% of the mean diameter); and by 99.73% of the spheres being within ±0.00074 inches of the mean diameter (i.e., being within about ±2.45% of the mean diameter). The spheres of FIG. 6B would be considered to comprise excellent size distribution for spheres produced by prior art methodology. However, comparison of FIGS. 6A and 6B shows that methodology of the present invention can produce a much better distribution of spheres than can prior art methods.

It can be desirable to have tight size distributions of spheres in numerous applications, including, for example, semiconductor processing applications utilizing solder spheres. For instance, if solder spheres are formed to tighter size distribution parameters, such can enable ball grid technologies to be preformed within tighter parameters, which can enable more uniformity in semiconductor device fabrication, and possibly reduce the percentage of device failures occurring as a result of errors in ball grid assembly.

Although FIG. 6A shows spheres produced to have a diameter of about 0.03 inches, it is to be understood that the invention can be utilized for forming spheres of numerous diameters. In particular embodiments, the spheres will have a diameter of less than or equal to about 0.05 inches. In accordance with the graph of FIG. 6A, such spheres can be characterized by at least 95% of the spheres being within about ±1.3% of a mean diameter of the plurality of spheres; or, in particular embodiments, within about ±1.2% of the mean diameter, with several hundred or even several million spheres being comprised by the plurality. Further, at least 99.73% of the spheres can be within about ±2% of a mean diameter of the plurality of spheres; or, in particular embodiments, within about ±1.8% of the mean diameter.

What is claimed is:

1. A method of forming a plurality of spheres, comprising:
   providing a passageway terminating in an orifice;
   flowing a liquid through the passageway and expelling the liquid through the orifice, the expelled liquid forming drops; wherein the orifice is upwardly directed, and wherein the expelling of the liquid comprises expelling the liquid upwardly from the orifice;
   passing the drops through a fluid to cool the drops and solidify the drops into a plurality of spheres;
   collecting at least some of the spheres; and
   maintaining a pressure of the liquid steady to within about ±10% during the formation of the drops that are cooled into the collected spheres.

2. The method of claim 1 wherein the pressure of the liquid is maintained steady to within about ±3% during the formation of the drops that are cooled into the collected spheres.

3. The method of claim 1 wherein the pressure of the liquid is maintained steady to within about ±0.05% during the formation of the drops that are cooled into the collected spheres.

4. The method of claim 1 further comprising maintaining a temperature of the liquid steady to within about ±5% during the formation of the drops that are cooled into the collected spheres.

5. The method of claim 1 wherein the liquid comprises a molten metal.

6. The method of claim 1 wherein the liquid comprises a molten mixture consisting essentially of one or more of tin, lead, copper and silver.

7. The method of claim 1 wherein the liquid comprises a molten glass.

8. The method of claim 1 wherein the liquid comprises a molten plastic.

9. The method of claim 1 wherein the fluid is a gas.

10. The method of claim 1 wherein the fluid is a gas and does not comprise $O_2$, and wherein the liquid is exposed to an ambient consisting essentially of the fluid from a time that the liquid is expelled until a time that the drops have solidified into spheres.

11. The method of claim 1 further comprising:
providing a sorting chute comprising a rotating tube, the tube being at an angle relative to horizontal of from greater than 0° to less than 90°;
passing the at least some of the spheres into the sorting chute; and
wherein the collecting comprises collecting the spheres exiting from the sorting chute.

12. The method of claim 11 further comprising passing the at least some of the spheres through at least one screen after the spheres exit the sorting chute.

13. The method of claim 11 further comprising passing the at least some of the spheres through a first screen after the spheres exit the sorting chute, and passing the spheres across a second screen after the spheres exit the sorting chute; one of the first and second screens being defined by a pore size greater than a diameter of the at least some of the spheres, and the other of the first and second screens being defined by a pore size less than a diameter of the at least some of the spheres.

14. The method of claim 11 wherein the angle of the tube is from about 5° to about 30° relative to horizontal.

15. The method of claim 11 wherein the tube rotates at a rate less than or equal to about 110 rotations per minute.

16. The method of claim 11 wherein the tube rotates at a rate of from about 10 rotations per minute to less than or equal to about 110 rotations per minute.

17. The method of claim 11 wherein the tube rotates at a rate of from about 50 rotations per minute to less than or equal to about 80 rotations per minute.

18. The method of claim 11 wherein non-spherical masses are contaminating particles amongst the at least some of the spheres, wherein the at least some of spheres exit from a bottom of the tube; wherein the non-spherical masses are along an edge of the tube above the bottom of the tube as the at least some of the spheres exit from the tube; and further comprising:
providing a vacuum directed at the non-spherical masses along the edge of the tube; and
removing the non-spherical masses from the edge of the tube with the vacuum.

19. The method of claim 1 wherein the at least some of the spheres have a velocity after being solidified, and further comprising:
providing a sorting chute comprising a rotating tube;
reducing the velocity by impacting the at least some of the spheres unto a landing;
rolling the at least some of the spheres from the landing into the sorting chute; and
wherein the collecting comprises collecting the spheres exiting from the sorting chute.

20. The method of claim 1 wherein the at least some of the spheres comprise at least several hundred spheres having a mean diameter of about 0.03 inches and characterized by at least 95% of the spheres being within about ±0.0004 inches of the mean diameter.

21. The method of claim 1 wherein the at least some of the spheres comprise at least several hundred spheres having a mean diameter of about 0.03 inches and characterized by at least 99.73% of the spheres being within ±0.0006 inches of the mean diameter.

22. The method of claim 1 wherein the at least some of the spheres comprise at least several hundred spheres having a diameter of less than about 0.05 inches and characterized by at least 95% of the spheres being within ±1.3% of a mean diameter of the spheres.

23. The method of claim 1 wherein the at least some of the spheres comprise at least several hundred spheres having a diameter of less than about 0.05 inches and characterized by at least 99.73% of the spheres being within ±2% of a mean diameter of the spheres.

24. A method of forming a plurality of spheres, comprising:
providing a passageway starting at an elevated bath and terminating in an upwardly directed orifice;
flowing a liquid from the bath, down through the passageway and upwardly through the orifice, the expelled liquid forming drops; the liquid being a molten form of material that is solid at room temperature; the passageway being heated above a melting temperature of the material to keep the material in a liquid form;
maintaining a level of the liquid within the bath steady to within about ±10% during the flow of the liquid from the bath;
passing the drops through a fluid to cool the drops and solidify the drops into a plurality of spheres; and
collecting at least some of the spheres.

25. The method of claim 24 wherein the level of the liquid within the bath is maintained steady to within about ±3% during the flow of the liquid from the bath.

26. The method of claim 24 wherein the level of the liquid within the bath is maintained steady to within about ±0.05% during the flow of the liquid from the bath.

27. The method of claim 24 wherein the material comprises one or more metals.

28. The method of claim 24 wherein the material consists of one or more metals.

29. The method of claim 24 wherein the material consists essentially of one or more metals.

30. The method of claim 24 wherein the material consists essentially of one or more of tin, lead, copper and silver.

31. The method of claim 24 wherein the material comprises a glass.

32. The method of claim 24 further comprising using the spheres as solder spheres in a semiconductor processing application.

33. The method of claim 24 wherein the material consists essentially of one or more of tin, lead, copper and silver; and further comprising using the spheres as solder spheres in a semiconductor processing application.

34. The method of claim 24 wherein the material consists essentially of one or more of tin, lead, copper and silver; and further comprising using the spheres as solder spheres in a ball grid array.

35. The method of claim 24 wherein the at least some of the spheres comprise at least several hundred spheres having a mean diameter of about 0.03 inches and characterized by at least 95% of the spheres being within about ±0.0004 inches of the mean diameter.

36. The method of claim 24 wherein the at least some of the spheres comprise at least several hundred spheres having a mean diameter of about 0.03 inches and characterized by at least 99.73% of the spheres being within about ±0.0006 inches of the mean diameter.

37. The method of claim 24 wherein the at least some of the spheres comprise at least several hundred spheres having a diameter of less than about 0.05 inches and characterized by at least 95% of the spheres being within about ±1.3% of a mean diameter of the spheres.

38. The method of claim 24 wherein the at least some of the spheres comprise at least several hundred spheres having a diameter of less than about 0.05 inches and characterized by at least 99.73% of the spheres being within about ±2% of a mean diameter of the spheres.

* * * * *

UNITED STATES PATENT AND TRADEMARK OFFICE
CERTIFICATE OF CORRECTION

PATENT NO. : 6,579,479 B1
DATED : June 17, 2003
INVENTOR(S) : Colin Edie et al.

It is certified that error appears in the above-identified patent and that said Letters Patent is hereby corrected as shown below:

<u>Column 6,</u>
Line 62, please replace "diameter if about 0.03 inches," with -- diameter of about 0.03 inches, --

<u>Column 7,</u>
Line 1, please replace "1/2 metal" with -- 1/2 inch metal --
Line 2, please replace "pipe, such as, for example, 1/2 stainless steel" with -- pipe, such as, for example 1/2 inch stainless steel --

<u>Column 9,</u>
Line 9, please replace "which separates spherical particles non-" with -- which separate spherical particles from non- --
Line 31, please replace "where a represents a standard deviation" with -- where $\sigma$ represents a standard deviation --

Signed and Sealed this

Ninth Day of September, 2003

JAMES E. ROGAN
*Director of the United States Patent and Trademark Office*